(12) United States Patent
Martinelli et al.

(10) Patent No.: US 10,469,161 B2
(45) Date of Patent: Nov. 5, 2019

(54) OPTICAL PATH FAULT RECOVERY

(71) Applicant: Cisco Technology, Inc., San Jose, CA (US)

(72) Inventors: Giovanni Martinelli, Monza (IT); Jean-Philippe Vasseur, Saint Martin d'uriage (FR); Gabriele M. Galimberti, Bovisio Masciago (IT)

(73) Assignee: Cisco Technology, Inc., San Jose, CA (US)

( * ) Notice: Subject to any disclaimer, the term of this patent is extended or adjusted under 35 U.S.C. 154(b) by 63 days.

(21) Appl. No.: 15/636,401

(22) Filed: Jun. 28, 2017

(65) Prior Publication Data

US 2017/0302371 A1    Oct. 19, 2017

Related U.S. Application Data

(62) Division of application No. 14/158,457, filed on Jan. 17, 2014, now Pat. No. 9,736,558.

(51) Int. Cl.
*H04B 10/038* (2013.01)
*H04Q 11/00* (2006.01)
(Continued)

(52) U.S. Cl.
CPC ........ *H04B 10/038* (2013.01); *H04J 14/0221* (2013.01); *H04J 14/0293* (2013.01);
(Continued)

(58) Field of Classification Search
CPC ........... H04Q 11/0067; H04Q 11/0005; H04Q 11/00; H04Q 2011/0081;
(Continued)

(56) References Cited

U.S. PATENT DOCUMENTS

| | | | |
|---|---|---|---|
| 6,587,235 B1 * | 7/2003 | Chaudhuri | H04B 10/032 370/216 |
| 7,178,052 B2 * | 2/2007 | Hebbar | H04L 45/00 379/221.04 |

(Continued)

OTHER PUBLICATIONS

Lang, J.P. et al., RSVP-TE Extensions in Support of End-to-End Generalized Multi-Protocol Label Switching (GMPLS) Recovery, Inter-Corporate Computer & Network Services, Inc., May 2007, Vancouver, Canada.

(Continued)

*Primary Examiner* — Abbas H Alagheband
(74) *Attorney, Agent, or Firm* — Patterson + Sheridan, LLP

(57) ABSTRACT

The embodiments disclosed herein provide fast recovery of a network signal path by, in the event of a failure or unacceptable degradation in a signal in the original network path, diverting the optical signal passing through the network to a preselected bypass optical path which is maintained in a warm or operational state. The optical elements on the bypass optical path are available network resources which may, during part or all of the time the bypass path is designated for a node in the primary optical path, be in use to transmit other optical signals in the network. By maintaining the resources in the designated bypass path in a warm or operating state, fast rerouting and recovery of an interrupted signal is possible.

12 Claims, 5 Drawing Sheets

(51) Int. Cl.
*H04L 12/707* (2013.01)
*H04L 12/703* (2013.01)
*H04J 14/02* (2006.01)

(52) U.S. Cl.
CPC .............. *H04L 45/22* (2013.01); *H04L 45/28* (2013.01); *H04Q 11/0005* (2013.01); *H04Q 11/0066* (2013.01); *H04Q 11/0067* (2013.01); *H04Q 2011/0011* (2013.01); *H04Q 2011/0016* (2013.01); *H04Q 2011/0081* (2013.01)

(58) Field of Classification Search
CPC ...... H04Q 2011/0016; H04Q 2011/008; H04B 10/038; H04L 45/28; H04L 45/22; H04L 12/703; H04L 12/707
USPC ................................ 398/5, 2, 25, 34, 45, 59
See application file for complete search history.

(56) References Cited

U.S. PATENT DOCUMENTS

| | | | |
|---|---|---|---|
| 7,197,008 B1* | 3/2007 | Shabtay | H04L 12/4633 370/218 |
| 7,224,897 B1* | 5/2007 | Slezak | H04J 14/0227 398/10 |
| 7,634,160 B2 | 12/2009 | Li et al. | |
| 7,835,267 B2 | 11/2010 | Zamfir et al. | |
| 8,089,864 B2* | 1/2012 | Beller | H04J 3/085 370/222 |
| 8,274,989 B1* | 9/2012 | Allan | H04L 45/16 370/432 |
| 8,565,598 B2 | 10/2013 | Gerstel et al. | |
| 8,627,137 B1* | 1/2014 | Vaidya | H04L 41/0672 370/218 |
| 8,953,432 B2* | 2/2015 | Ansari | H04L 45/02 370/216 |
| 2003/0223359 A1* | 12/2003 | Einstein | H04L 45/00 370/228 |
| 2005/0089027 A1 | 4/2005 | Colton | |
| 2005/0281192 A1* | 12/2005 | Nadeau | H04L 45/00 370/217 |
| 2006/0045007 A1* | 3/2006 | Huck | H04J 3/14 370/226 |
| 2006/0188253 A1* | 8/2006 | Shimada | H04B 1/745 398/31 |
| 2006/0250948 A1* | 11/2006 | Zamfir | H04L 45/02 370/216 |
| 2006/0256712 A1 | 11/2006 | Imajuku et al. | |
| 2007/0280690 A1 | 12/2007 | Bouda et al. | |
| 2008/0138063 A1 | 6/2008 | Akasaka et al. | |
| 2008/0219268 A1* | 9/2008 | Dennison | H04L 12/4625 370/395.2 |
| 2009/0252033 A1* | 10/2009 | Ramakrishnan | H04L 12/18 370/228 |
| 2010/0290780 A1* | 11/2010 | Teipen | H04B 10/27 398/27 |
| 2011/0013507 A1* | 1/2011 | Gazzola | H04J 14/0287 370/216 |
| 2011/0170859 A1* | 7/2011 | Conklin | H04J 14/0227 398/25 |
| 2011/0229122 A1* | 9/2011 | Castoldi | H04J 14/0227 398/2 |
| 2011/0268439 A1* | 11/2011 | Gerstel | H04L 45/124 398/34 |
| 2012/0099423 A1* | 4/2012 | Wang | H04L 12/43 370/222 |
| 2012/0141117 A1* | 6/2012 | Kang | H04J 14/0268 398/5 |
| 2012/0207017 A1* | 8/2012 | Ceccarelli | H04L 12/437 370/227 |
| 2013/0028073 A1* | 1/2013 | Tatipamula | H04L 41/12 370/218 |
| 2013/0114403 A1* | 5/2013 | Grover | H04L 41/0663 370/228 |
| 2013/0215769 A1* | 8/2013 | Beheshti-Zavareh | H04L 45/64 370/252 |
| 2015/0208147 A1 | 7/2015 | Martinelli et al. | |
| 2015/0215032 A1* | 7/2015 | Bevilacqua | H04J 14/0267 398/5 |
| 2015/0244453 A1* | 8/2015 | Bottari | H04J 14/00 398/5 |
| 2016/0036520 A1* | 2/2016 | Swinkels | H04B 10/03 398/1 |

OTHER PUBLICATIONS

Berger, L. et al., GMPLS Segment Recovery, May 2007, <http://www.ietf.org/rfc/rfc4873.txt>.

* cited by examiner

OPTICAL PATH FAULT RECOVERY

CROSS-REFERENCE TO RELATED APPLICATIONS

This application is a divisional of U.S. Pat. No. 9,736,558, filed Jan. 17, 2014. The aforementioned related patent application is herein incorporated by reference in its entirety.

BACKGROUND OF THE INVENTION

Embodiments disclosed herein relate to the field of wavelength switched optical networks, or "WSON's". More particularly, embodiments disclosed herein relate to methods and apparatus for reducing interruptions in data flow which may occur when a network element, node or connection fails or underperforms, by switching the data path through the network to a preselected alternate path that is maintained in a ready to receive mode.

WSON's employ fiber connected at optical cross connects, or nodes, at the data plane to carry a light based signal through a network. The optical signals are commonly multiplexed, i.e., more than one optical signal may be routed through an optical cross connection, but the different signals are transmitted at different wavelengths, so as to mitigate cross talk between the signals. Each optical cross connect is connectable to two or more light carrying fibers, such that light entering an optical cross connect may be selectively routed therefrom to one or more onward transmitting or carrying fibers. The selection of the light path, and configuration of the optical cross connects, is defined at the control plane of the network, which commonly includes a network control device for each optical cross connect in the data plane being controlled. The optical cross connect components may include one or more node elements, such as variable optical attenuators, or "VOA's", regenerator devices which receive and transmit the optical signal after undertaking a noise reduction or other corrective action on the signal, or combinations thereof. Generalized multi protocol label switching protocol, or "GMPLS", is commonly used for the control plane, although other protocols are used.

During operation of a WSON, one or more of the fiber or node devices may experience deterioration or failure, such that the resulting light signal passing therethrough is unacceptably degraded or lost. In such cases, the control plane of the WSON systems may then locate additional fiber pathways and node devices which are not in use, and switch the data stream which was passing through the now degraded or failed component(s) to these newly selected resources. This allows the WSON to recover and continue transmitting a data stream therethrough, but an unacceptable delay occurs during the recovery process caused in significant part by the need to turn on and tune the additional node devices to accept the signal. These components, which include variable optical attenuators (VOA's) and regenerators, must be brought on line, tuned to the frequencies of the wavelengths of the multiplexed light of the signal stream, and the amplification/attenuation of the signal adjusted to a desired level. For example, multiple channels (e.g., data transmitted on a respective carrier wave) may be multiplexed onto a single optical fiber. The nodes may include respective VOAs for each of the channels. The VOAs may attenuate the light associated with the channels such that the power of each channel is substantially the same. As such, when the optical signal is amplified before being multiplexed and transmitted to the next node, the amplitude of the light in each channel is the same, thereby mitigating cross talk between the channels. At the control plane, the detection of an optical impairment, and validation of a new or bypass routing, can take a few seconds. However, at the data plane, these steps can take as long as 2 to 3 seconds per node to adjust the power or attenuation/amplifications, and, where a node is being used that was not previously in use and was in standby mode, up to 10's of seconds to bring the node on line. Thus, where several nodes must be sequentially identified, activated, adjusted and tuned, the time to overcome a service interruption or unacceptable signal degradation may be in the range of minutes, which may result in poor network performance following the service interruption.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Overview

Figure 1:
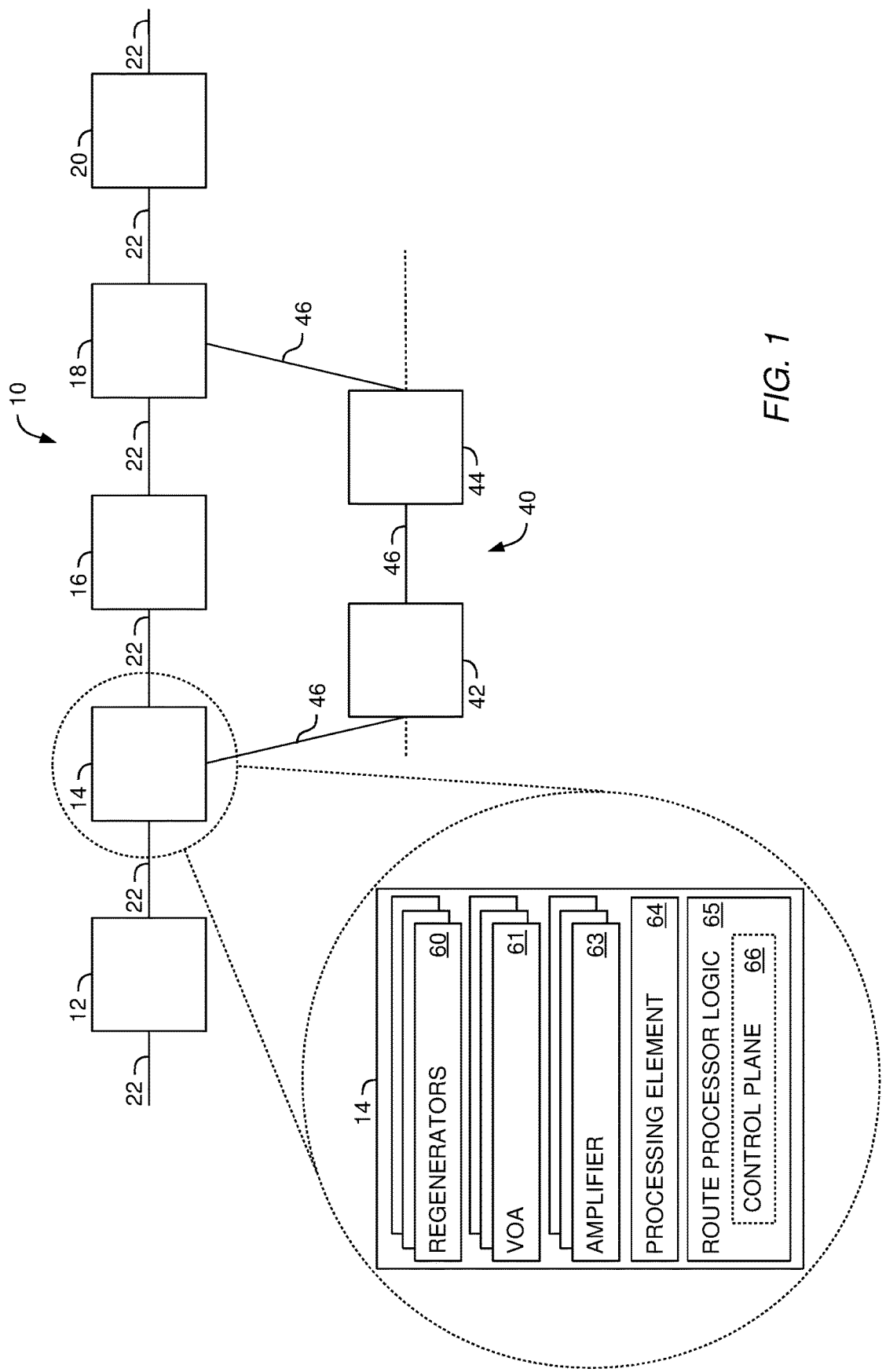
FIG. 1 is a block diagram of a portion of an optical network, showing schematically a primary signal pathway and a pre-selected bypass signal pathway according to one embodiment disclosed herein.

The present disclosure provides a wavelength switched optical network, in which unused switching resources such as regenerators and VOA devices are maintained in a "warm" condition, such that upon the occurrence of a failure or unacceptable degradation in one or more devices in an existing data path, the data stream may be diverted around the failed or degraded performance device(s) to the warm devices in a path that returns the data stream back to the original data path downstream of the location of the failure or degradation in service.

In one aspect, a bypass optical signal pathway for a node or nodes of a primary optical signal pathway is selected from one or more non-dedicated alternate nodes in an optical network, and the node devices of that bypass optical signal pathway are maintained in an operating status, but, the operating status is such that they are configured to accept and transmit data signal(s) other than a data signal in the primary optical pathway, except upon a failure in a node element of the primary pathway through which the data signal is originally travelling. Upon a service interruption of one or more nodes in the intended signal path, the node resources on the bypass pathway may be rapidly tuned to the wavelength of the signal moving from the primary to the bypass pathway, thus enabling rapid rerouting of the signal without the delay attendant in warming up multiple node devices to carry the bypass signal, and, because the bypass pathway nodes are maintained in an on state, the time delay in setting the power or amplification of the signal through the node is significantly reduced or eliminated. Thus, where a node in a signal route fails, or the signal therethrough is significantly reduced or attenuated, the control plane, upon recognizing the failure or signal degradation, switches the routing to a receiving node in the bypass pathway, around the failed or degraded node, and thence back to the primary pathway.

In another aspect, in a method of protecting the integrity of a data signal travelling through an optical network, a bypass optical signal pathway to protect a node or nodes of a primary optical signal pathway is selected from among available, but not dedicated to a bypass function, node devices in an optical network, and the node devices of that path are maintained in a warm status. Upon a service interruption of one or more nodes in the intended signal path, the node resources on the bypass pathway may be rapidly engaged to direct the data signal from the primary to the bypass pathway, thus enabling rapid rerouting of the signal without the delay attendant in warming up multiple node devices to carry the bypass signal. In another aspect, an optical network path is configured to include a primary path having a plurality of optical node elements interconnected by fiber and a preselected, but not dedicated, bypass optical path for at least one of the optical node elements of the primary path. The bypass path includes least one optical node element therein, and that optical node element is maintained in a warm state during at least a portion of the time during transmission of a signal through the primary path. The bypass optical path connects to the primary path at a location upstream and downstream of the optical node for which the bypass optical path is preselected.

The bypass pathway devices may include VOA devices, regenerator devices, or combinations thereof. The devices and node elements of the bypass pathway are not dedicated elements for redundancy for other nodes, but are devices and node elements which have available bandwidth to receive a bypassed signal therethrough, and may or may not be in use for carriage of an additional signal therethrough. At the control plane, the status of the devices and nodes of the network may be monitored, such that dynamic configuration of a bypass pathway for one or more elements of the network may be maintained, and changed, as the usage of the network devices and nodes changes. The devices identified for bypass of any given node are maintained in an on or warmed up state, and may be resources which are concurrently in use as part or all of a pathway to carry another optical signal therethrough. Thus, in that case, the bypass pathway, and the wavelength for carriage of the rerouted optical signal through the bypass pathway, are selected to carry the rerouted signal without interference with the other signal passing therethrough.

Example Embodiments

Described herein are embodiments relating to the redirection of an optical signal from a primary signal pathway, through a preselected bypass pathway, wherein one or more resources of the primary pathway have failed or are contributing to an unacceptable degradation in the performance thereof.

Referring initially to FIG. 1, an optical signal pathway, including a primary pathway and a bypass pathway, are shown schematically. In this embodiment, a primary optical pathway 10, and a secondary, bypass optical pathway 40, are shown. The primary optical pathway 10 includes a plurality of node elements 12, 14, 16, 18, 20, interconnected together by fiber segments 22. A fewer or greater number of nodes may be used in the primary pathway 10, and the number of nodes shown and described in the embodiment is chosen for purposes of illustrating the embodiment.

Although the blowup illustrates the different components in node element 14, any of the node elements 12, 16, 18, 20, 42, and 44 may include regenerators 60, VOA devices 61, amplifiers 63, one or more processing elements 64, or combinations thereof. The node elements may also include route processor logic 65 (e.g., hardware, firmware, software, or combinations thereof) used to generate a control plane 66 for routing received packets in the network. The control plane 66 is shown as a dotted line to indicate it is established by the logic 65 and is not a physical component of the network node 14. As the light signal traverses from node 12 to node 20, each node may optically attenuate the signal, and/or it may receive the signal, perform a conversion of the signal to remove noise upon the signal and/or amplify the signal, and/or modify the wavelength of the signal, and then transmit the signal to the next node in the primary pathway. The optical components in a node element (e.g., regenerators 60, VOAs 61, amplifiers 63, etc.) are tuned to receive and transmit therethrough only certain wavelengths of a signal. Thus, if the optical components receive a light signal therein of the wavelength(s) to which they are tuned, the components will pass that signal on to the next node of the primary pathway. If a signal of a wavelength for which the components are not tuned is received, they will not pass the signal through to the next node.

In the illustrated embodiment of FIG. 1, if the node element 16, or the fiber carrying the light signal from node 14 to node 16 or from node 16 to node 18 fails or significantly degrades, the light signal will not reach its intended destination unless it is re-routed through one or more alternative devices and fiber paths to overcome the failure and allow continued transmission of the signal. In the embodiment of FIG. 1, this rerouting occurs through the bypass pathway 40 of bypass nodes 42 and 44 and bypass fiber 46. In this embodiment, bypass fiber 46 carries the signal from node 14, to bypass node 42, thence to bypass node 44, and then back to node 18 of the primary pathway 10, thus bypassing the failed or degraded pathway through node 16 on the primary pathway 10.

In this embodiment, the bypass pathway 40 is a precalculated rerouting of the optical signal in the event of a signal interruption through node 16, that is, the control plane of the network identified a bypass pathway, based on available network resources and the wavelength of the signal to be bypassed, over which to route the light signal if there is a failure or unacceptable degradation in performance through node 16. The control plane of the network (which includes the individual control planes 66 established by the network nodes) may preselect an alternative, bypass pathway for each node in the primary path by exchanging control plane data traffic, and only the bypass pathway for node 16 is illustrated herein. Additionally, the identified resources for the bypass pathway 40 are maintained in a "standby" mode, that is, they are kept on, such that they need not be warmed up to be used, but, are also maintained such that any signal coming out of node 14 of the primary pathway does not pass therethrough. This may be accomplished by having an optical switch at node 14 controlled at the control plane level, which selects the output path of node 14 based upon the operating condition of the pathway therefrom through node 16, or, by tuning the optical components in node 14 (e.g., a regenerator) such that the bypass pathway 40 is transmitting light between at least two of the nodes in the pathway 40 even though the light does not carry data, i.e., in a warm state. As a result, even though light is transmitted through both the fiber 22 in the primary pathway 10 and the fiber 46 extending from node 14 to node 42 in parallel, the light passing through the bypass pathway 40 during normal operation of the primary pathway 10 will not carry data while the light passing through the primary pathway 10 does. However, because the nodes 42 and 44 are maintained in an on, yet unused for transmitting data condition, they may be rapidly switched to accommodate the optical signal on primary pathway 10 therethrough in the event of a failure at node 16, without the need to warm up nodes 42 and 44, thereby enabling rapid redeployment of the optical signal (which includes the data) through the bypass pathway without the attendant several second delay, per bypass node element, to warm up the elements of the bypass pathway for the optical signal. The delay in switching the signal may thus be on the order of tenths of a second or less, equal to the time needed to switch the output path in node element 12, or to re-tune the bypass node elements 42, 44 to accept the wavelength transmitted by node element 14 of the primary path 10.

Figure 2:
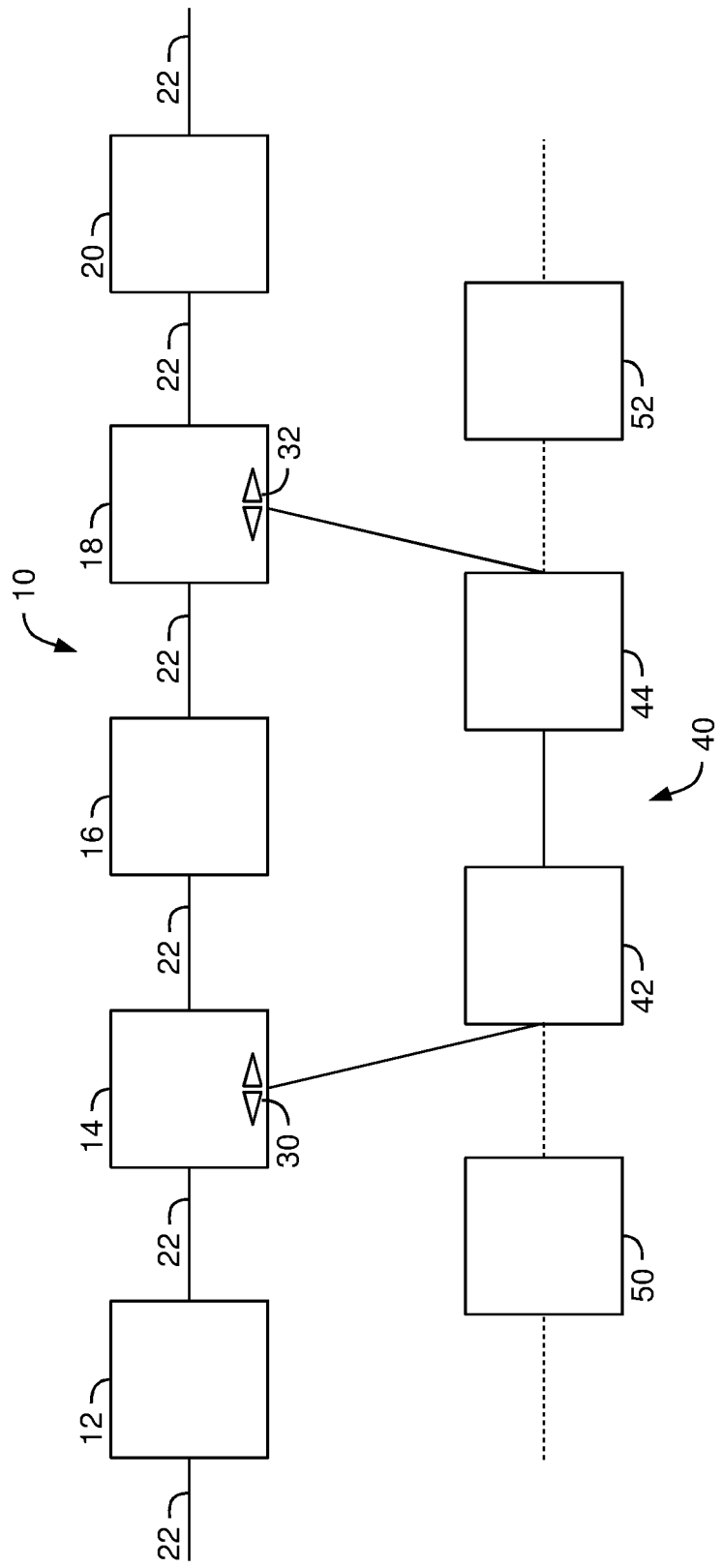
FIG. 2 is a block diagram of a portion of an optical network, showing schematically a primary signal pathway and a pre-selected bypass signal pathway employing regenerator devices according to one embodiment disclosed herein.

Referring now to FIG. 2, wherein like features as compared to the embodiment described with respect to FIG. 1 have the same reference numerals and names, an embodiment herein is shown wherein the use of one or more free regenerators in a regenerator pool is shown. In this embodiment, one or more regenerators may be available at a node on the primary optical pathway 10, such as at node elements 14 or 18. In this embodiment, by using free, i.e., unused, regenerators on the primary light path at nodes on the upstream and downstream side of the failed node, such as at nodes 14 and 18 where the light pathway through the intervening node 16 has failed, greater flexibility in operation may be provided. In this embodiment, other regenerators may be present at nodes 14 and 18, but are not needed to convert the data signal for transmission through the bypass pathway 40, or are in use at the node 14 or 18 in relation to other signals passing through that node.

After bypassing of the signal, the optical path through node 16 may be repaired or restored, and at that time, the optical signal can be restored to the original pathway 10 by warming up the node element 16, and switching the signal at node 14 to be redirected to the primary path, or by detuning the node element 42 on the bypass pathway away from the wavelength of the bypassed signal and thereby cutting off the bypass path, or both.

As shown in FIG. 2, an additional embodiment of a portion of the network is shown. In this embodiment regenerators 30, 32 having available regeneration capacity are available at node elements 14, 18, respectively. That is, nodes 14 and 18 may have a plurality of regenerators of which the regenerators 30 and 32 are currently unused or have available regeneration capacity. As used herein, a regenerator is a device that performs an optical-to-electrical conversion and electrical-to-optical conversion. In one embodiment, while in the converted optical signal is in the electrical domain, the regenerator may reshape, filter, and otherwise alter the electrical signal (e.g., to remove noise) before converting the electrical signal into an optical signal. Moreover, because of this dual-conversion function, the regenerator is able to detect, at its input, an optical signal with a first wavelength (or range of wavelengths) but retransmit the optical signal (carrying the same data) with a second wavelength (or range of wavelengths).

In this embodiment, the optical signal travels through the fiber 22 to node element 12, to node element 14 which includes or is associated with at least one regenerator 30, to node element 16, to node element 18 which includes or is associated with at least one regenerator 32, and thence onward to node element 20. In this embodiment, as node elements 14 and 18 include available regenerators 30 and 32, which may be used to warm up the bypass pathway 40 between node 14 and node 18. That is, before a failure in the primary pathway 10, the regenerator 30 may transmit an optical signal between node 14 and node 42 even if this signal does not carry data. Although not shown, node 14 may include optical cross-connects that determine whether the data signal is routed from node 14 to node 42 using regenerator 30 or from node 14 to 16 using a different regenerator. Once the control plane detects a failure in path 10 between node 14 and node 18, the optical cross-connect may re-route the traffic onto regenerator 30 so that the data is then routed along the bypass pathway 40. Similarly, node 18 may include an optical cross-connect that forwards the output of regenerator 32 node 20. Accordingly, the optical signal used in the bypass pathway 40 may either use the same wavelength or wavelengths as the optical signal in the primary path 10 or the regenerator 30 may be tuned to a different wavelength or wavelengths. If different wavelengths are used, then regenerator 30 performs a wavelength conversion so that it detects light at wavelength used by primary path 10 but transmits an optical signal at the wavelength in bypass pathway 40. Conversely, regenerator 32 reconvert the optical signal received at node 18 so that the optical signal transmitted from node 18 to node 20 is the original wavelength (i.e., the wavelength used when transmitting from node 12 to node 14). Thus the nodes downstream and upstream of the nodes at which the signal is sent to and received from the bypass pathway are not affected or impacted by the failure at node 16.

As in the embodiment described with respect to FIG. 1, this embodiment includes a preselected bypass pathway 40, having node elements 42 and 44 therein, connected by multiple fiber segments 46, such that bypass node element 42 is interconnected between node element 14 on primary path 10 and bypass node element 44, and bypass node element 44 is connected between bypass node element 42 and primary node element 18. Thus, in the event of a failure of the primary pathway 10 through node element 16, the optical signal may pass from node element 14, to bypass node element 42, to bypass node element 44 and back to node element 18 on the primary path. When the optical path through node element 16 is restored, the optical cross-connect on node 14 may forward the optical signal to node 16 instead of to node 42. Similarly, the optical cross-connect on node 18 forwards the signal received from node 16 rather than the signal received from node 44.

In this embodiment, bypass node elements 42 and 44 may be node elements which are being used on a different optical pathway to convey an optical signal different than that being carried on the primary pathway. Thus, in this embodiment, the bypass node elements 42, 44 may, but need not be, in use for transmitting therethrough a different wavelength signal travelling along a different path, such as from node element 50, to node element 42, to node element 44 to node element 52, but sharing the common or shared node elements 42, 44 in the bypass pathway 40 with a different optical signal. In this embodiment, although the bypass pathway nodes 42 and 44 may be in use, they also have additional, unused bandwidth, which may be employed to carry the bypassed signal from the primary pathway 10 therethrough at a different optical wavelength (i.e., different channels) to avoid cross talk between the bypassed optical signal and the signal travelling on the different path. At the control plane, the nodes preselected for a bypass pathway around a failed node in the primary pathway considers the load and free bandwidth on accessible alternate nodes in the network, in predetermining a bypass optical pathway for a failed primary pathway node. Therefore, in the event of a failure or unacceptable degradation of the path through node element 16 of the primary pathway 10, whether by failure of the node element 16 or other reasons, the optical signal may be rerouted through the bypass pathway 40 taking into account the preexisting use of the bypass node elements 42, 44 such that the regenerator 30 may, if required to prevent cross talk with a preexisting signal passing through the bypass node elements 42 and 44, change the wavelength of the signal received at node 14 to a wavelength compatible with another optical signal passing through the bypass nodes 42, 44, and, at primary pathway node 18, convert that signal back to the wavelength of the optical signal received at primary node 14 from node 12. However, in other embodiments, the wavelengths used in the bypass pathway 40 are the same as the wavelengths used in the primary path 10.

In one embodiment, before the failure of the primary path 10, the optical signal may pass through each segment of the bypass pathway 40. That is, regenerator 30 outputs light to node 42 which then passes the optical signal using, for example, one or VOAs and/or amplifiers to node 44 which also passes the light to node 18. Of course, it is possible that node 42 and/or node 44 may also have spare or available regenerators that may also be warmed up before detecting a failure in the primary path. In one embodiment, the VOAs and/or amplifiers may have to be tuned after the primary path 10 fails. Nonetheless, because the optical signal already flows through the VOAs, the control plane may be able to tune these components in parallel rather than sequentially thereby reducing the time needed to begin data transmission using bypass pathway 40. Furthermore, the control plane needs only to change the optical cross connects associated with the regenerators 30 and 32 such that they detect and transmit, respectively, the wavelength corresponding to the original optical signal transmitted in the primary pathway 10. Advantageously, these modifications may take less time than if the regenerator 30 was not already transmitting an optical signal in at least one segment of the bypass pathway 40.

Although the previous embodiment described transmitted an optical signal through each segment of the bypass pathway 40, this is not a requirement. Instead, the advantages of these embodiments are still available if only certain segments of the bypass pathway 40 are warmed up before the failure of the primary pathway 10. As an example of this, only the network segments between the upstream regenerator 30 and the downstream node 42 may be warmed up—i.e., have the optical signal flowing therebetween.

Although the bypass pathway 40 is shown connected to the node elements immediately upstream and downstream of the failed or degraded node 16, the signal may be bypassed further upstream from the failed node, and returned to the original primary pathway further downstream from, the immediately adjacent node elements to the failed element. For example, where there is no regenerator associated with the node element immediately before or after the failed or degraded node, the optical signal may be diverted further upstream of the node immediately before the failed node, or returned at a node further downstream of the failed node, where an available regenerator is associated with those nodes but not to the nodes immediately adjacent to the failed node element(s). This flexibility is determined by available resources and existing connections within the network.

Figure 3:
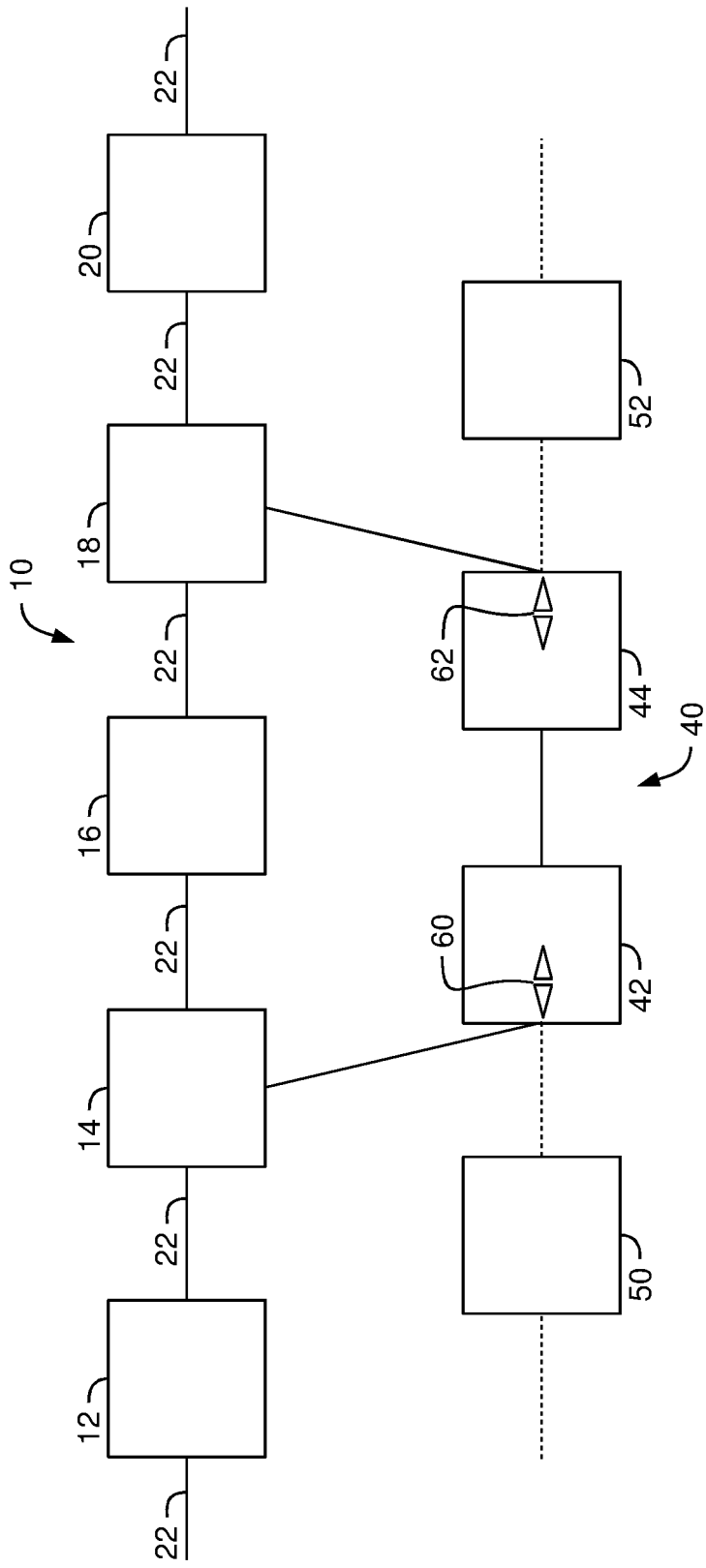
FIG. 3 is a block diagram of a portion of an optical network, showing schematically a primary signal pathway and a pre-selected bypass signal pathway employing regenerator devices according to one embodiment disclosed herein.

Referring now to FIG. 3, an additional embodiment is shown wherein the bypass pathway 40 includes free regenerator resources. Like elements of this embodiment are, in comparison to FIGS. 1 and 2, labeled the same. In this embodiment, when a failure or unacceptable signal event occurs through node element 16 on the primary pathway 10, the optical signal is bypassed through the bypass pathway 40. In contrast to the embodiment of FIG. 2, in this embodiment the bypass pathway nodes 42 and 44 include regenerators 60, 62 associated therewith. Before the primary path 10 fails, the control plane may warm up the regenerators 60 and 62 such that an optical signal passes from node 42 to node 44 even if this optical signal does not carry data. When the optical signal is diverted from primary pathway 10 to bypass pathway 40 at node element 14 using, for example, an optical cross connect, the regenerator 60 at node element 42 of the secondary pathway receives the signal and regenerates the signal which may have the same or different wavelength(s). Additionally, the node elements 42, 44 may be a part of a different pathway for a different optical signal than that being carried on primary pathway 10, and the wavelength at which the optical signal being bypassed through bypass pathway 40 must be different than, and compatible with, the signal already being carried through node elements 42 and 44. Thus, in this case, the regenerator 60 is configured to convert the optical signal to a compatible wavelength with the preexisting signal. Then, at node element 44, regenerator 62 converts the optical signal wavelength of the bypassed signal (if necessary) back to the original optical signal wavelength for carriage on the primary pathway 10 through node element 20 on the primary pathway 10. Upon restoration of the optical pathway through node 16, input of the regenerator 60 is returned, by the control plane, thereby stopping data transfer in the bypass pathway 40.

In one embodiment, the segments of the bypass pathway 40 that are upstream of the regenerators may have optical light transmitted therein prior to the failure of the primary path 10. For example, the control plane may wait until the primary path 10 fails before permitting the optical signal to transfer from node 14 to node 42. However, this is not a requirement. In another embodiment, optical components in node 14 may transmit the optical signal to both node 16 and node 42 before the failure of primary path 10. In this case, the an optical cross connect in node 42 may ensure that the data does not flow through bypass pathway 40—e.g., the optical signal transmitted between regenerator 60 on node 42 and node 18 is an unpopulated carrier wavelength.

Figure 4:
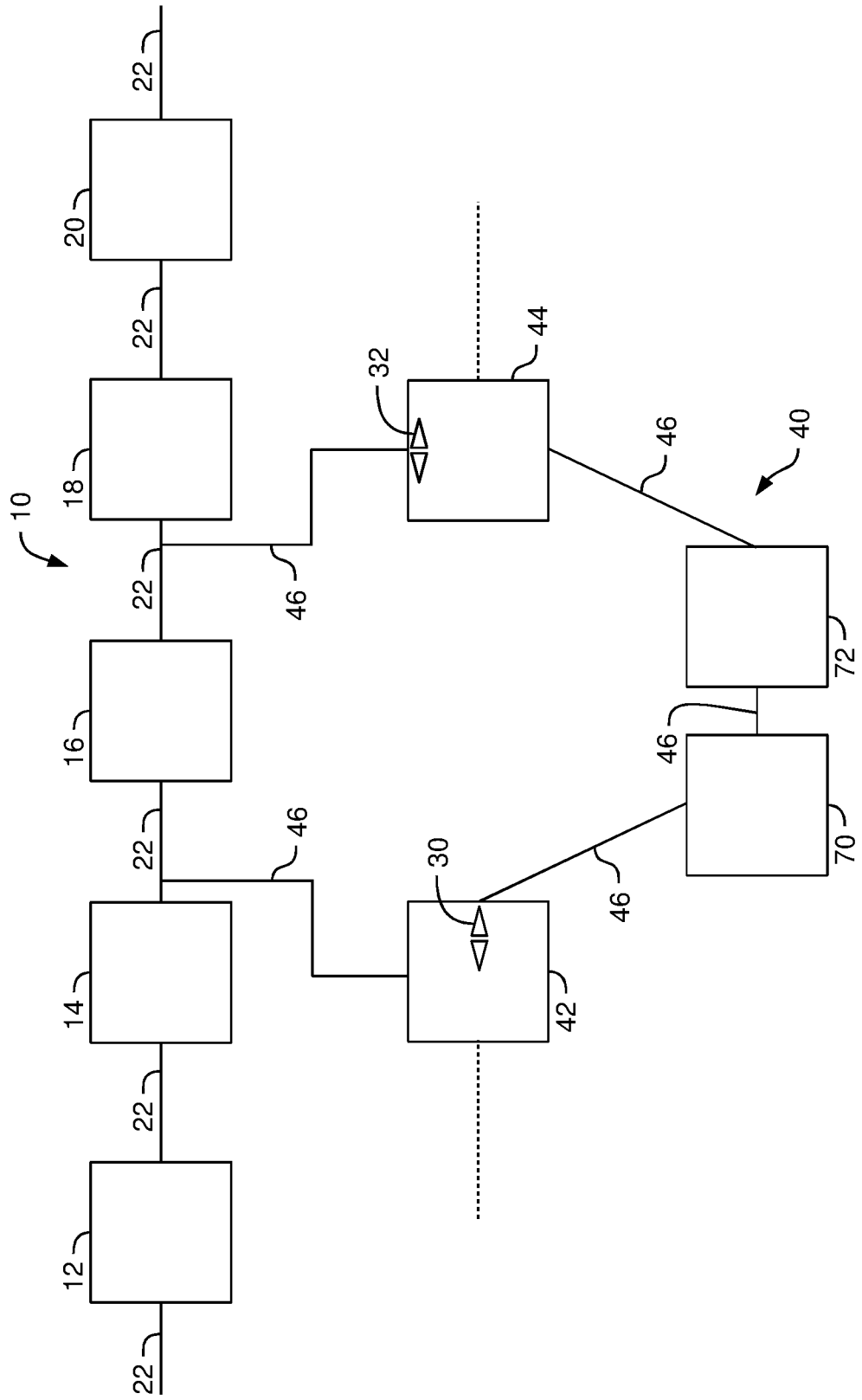
FIG. 4 is a block diagram of a portion of an optical network showing a configuration of a preselected bypass pathway according to one embodiment disclosed herein.

Referring now to FIG. 4, a further embodiment of the network is shown. Again, like elements of the embodiment are, in comparison to FIGS. 1-3, labeled the same. In this embodiment, the nodes available to the nodes in the primary pathway to either side of the node being protected, which will be the initial and final nodes of a bypass pathway, may not be directly connected together, and thus the bypass pathway may require additional node elements to effectively form a bypass for a node in the primary pathway. In this embodiment, when a failure or unacceptable signal event occurs through node element 16 on the primary pathway 10, the optical signal is bypassed through the bypass pathway 40. In one embodiment, the segments 46 that are attached to the regenerators 30 and 32 are warmed up before a failure is detected in the primary path. That is, node 42 may use regenerator 46 to send an optical signal (without data) to node 70 while node 44 uses regenerator 32 to send an optical signal (without data) to node 18. After detecting a failure in the primary path 10, node 14 reroutes the data signal to node 42 and the VOAs in nodes 70 and 72 may be tuned in parallel rather than sequentially thereby reducing the time needed to begin data transmission using bypass pathway 40. An optical cross connect in node 18 may then forward the data signal received from regenerator 32 to node 20. As in the embodiments discussed above, the bypass pathway 40 may either use the same wavelengths or different wavelengths used by the primary path 10.

When the control plane preselects a bypass pathway for a node, available node resources having regenerators may not be directly connected together, such as the node elements 42 and 44 as shown in FIG. 4. However, these node elements 42 and 44 can be connected through other node elements, for example node elements 70, 72 as shown in FIG. 4. As shown in FIG. 4, when a failure or interruption occurs between nodes 14 and 18 (at or through node 16), the control plane operates to enable the optical signal transmitted from node element 14 to be regenerated by regenerator 30, and the signal is then transmitted through node elements 70, 72 and on to node element 44, wherein the regenerator 32 associated therewith.

To reroute the signal from the node element 14 to node 42, a Y cable connection can be employed such that the signal transmitted from node element 14 is present at both the node element 42 and 16. A Y cable may also be used such that respective optical signals transmitted by node elements 16 and 44 reach node element 18 which selects which signal to forward to node element 20. As with the previous embodiments hereof, the node elements 42, 44 and 70, 70 are maintained in a warmed up state such that the regenerators are already in a state ready for transmitting the optical signal along the bypass pathway 40. Additionally, some or all of the other network elements (e.g., VOAs, amplifiers, etc.) in the node elements 42, 44, 70, 72 may also be pre-tuned to the desired frequency for passing the optical signal therethrough, or, they may be tuned upon the detection of a failure at the control plane.

Figure 5:
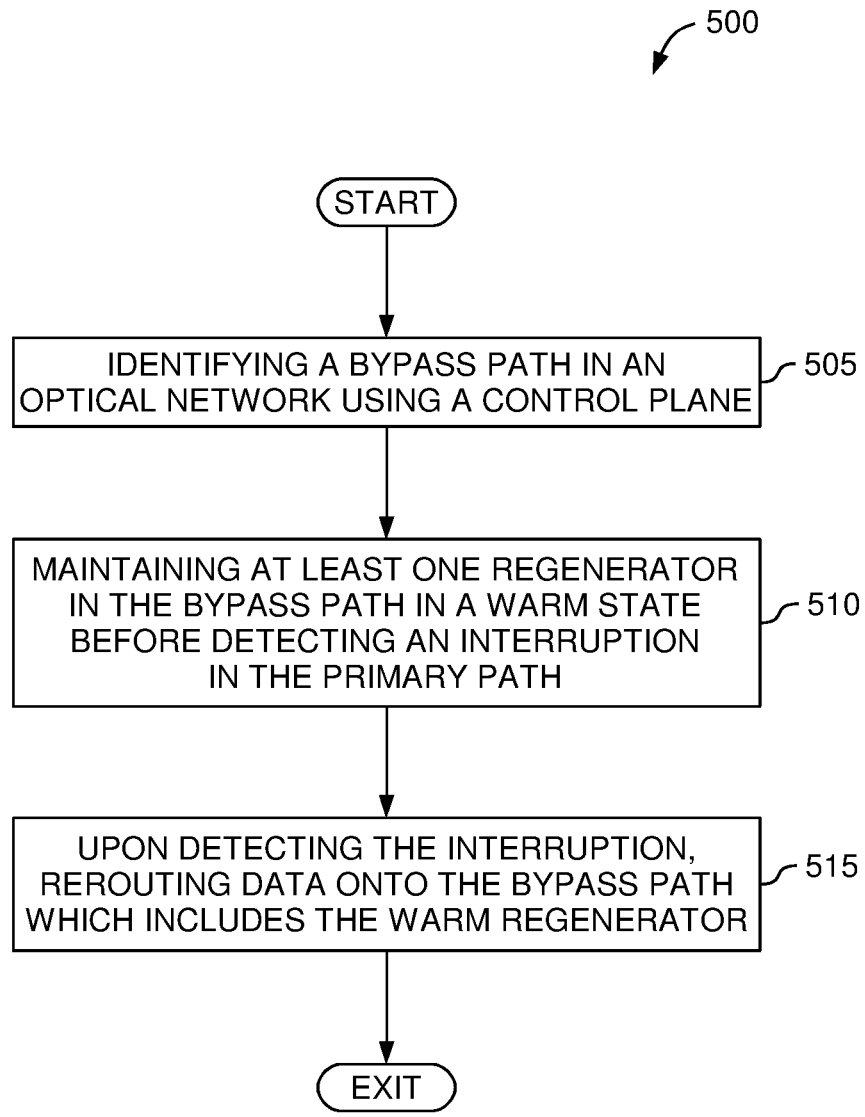
FIG. 5 is a flow chart for warming up a bypass pathway according to one embodiment disclosed herein.

FIG. 5 is a flow chart 500 for warming up a bypass pathway according to one embodiment disclosed herein. At block 505, a control plane identifies a bypass pathway that may be used in the event of a service interruption to a primary pathway. The bypass pathway may either be defined by a network operator or a search algorithm can be used to identify nodes for the bypass pathway based on, for example, bandwidth, connection speeds, proximity, and the like. As such, in one embodiment, the bypass pathway may change as the operating parameters of the optical network vary.

At block 510, the control plane selects at least one regenerator in the bypass pathway to maintain in warm or on state. For example, a node in the network may have a pool of regenerators. The control plane may use one or more criteria for selected a regenerator from the pool such as whether the regenerator is available, not dedicated to another resource or task, functional, and the like.

After the regenerator is selected, the control plane maintains the regenerator in the warm state. In this state, the regenerator may transmit an optical signal along a portion of the bypass path but the optical signal may not contain data, or at least, the optical data may not contain the same data as that flowing in the primary pathway. The regenerator may either be located on a node that is also in the primary pathway (e.g., as shown by node 14 in FIG. 2) or may be located only in a node in the bypass path (e.g., as shown by node 42 in FIG. 3). Further still, the control plane may identify a pair of regenerators which are used to define a warmed up portion of the bypass pathway. That is, before detecting a service interruption in the primary path, the upstream regenerator may output an optical signal that traverses one or more nodes in the bypass path before reaching the downstream regenerator. The nodes hosting the upstream and downstream regenerators may have respective optical cross connects that isolate the regenerators in the bypass path from the primary path.

At block 515, upon detecting the service interruption in the primary path, the control plane reroutes the data intended to the primary path to the bypass path. Because the regenerator (or regenerators) is already in a warm state, it is already prepared to transmit the data through the bypass pathway. In one embodiment, however, the control plane may have to configure other optical components (e.g., VOAs) in the bypass path after the service interruption and before data flows along bypass path. Nonetheless, method 500 offers a faster technique for rerouting data following an interruption in a primary path relative to not maintaining one or more regenerators in the warm state.

Embodiments for the protection of an optical signal where one or more optical switching and/or conditioning elements experience failure or service degradation has been described herein. The embodiments employ, independently or jointly, regenerators, VOAs, or other network elements that are not dedicated for signal path redundancy, to effectively reroute a signal through the network upon a failure or degradation of the signal through the original path without the need to warm up some or all of the optical elements in the reroute or bypass pathway, such that the time required to restore the signal is significantly reduced. The bypass pathway for any node in the primary pathway need not be statically maintained, and an optical bypass pathway for each node, based on the use and configuration of the network resources, may be dynamically maintained such that the optimal bypass pathway for any node is different based on network loading and resource availability.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of protecting integrity of an optical signal transmitted via an optical path in an optical network upon a failure or degradation in the optical path, comprising:
   selecting an operational node in a primary optical path in the optical network having the optical signal passing therethrough;
   selecting, for the operational node, a bypass optical path to be used in response to a failure or interruption of the operational node;
   maintaining at least one device in the selected bypass optical path in a warm state during operation of the operational node where the at least one device transmits an optical signal without carrying data, and has sufficient availability to carry a bypassed optical signal therethrough.

2. The method of claim 1, wherein, upon the failure of the operational node, redirecting the optical signal to the bypass optical path.

3. The method of claim 2, wherein the optical signal comprises a first wavelength, and the bypass optical path comprises a device that is tuned to a second wavelength that is different than the first wavelength.

4. The method of claim 3, wherein redirecting the optical signal includes regenerating the optical signal of the second wavelength.

5. The method of claim 4, wherein regenerating the optical signal occurs in the primary optical path.

6. The method of claim 4, wherein regenerating the optical signal occurs in the bypass optical path.

7. The method of claim 2, wherein the at least one device is a regenerator.

8. An optical network path, comprising:
   a primary path having a plurality of optical nodes interconnected by fiber;
   a preselected bypass path for at least one of the plurality of optical nodes of the primary path, the bypass path including at least one node device therein, the node device having available bandwidth to carry a bypassed optical signal, and the node device is maintained in a warm state during at least a portion of a transmission of an optical signal through the primary path, wherein, in the warm state, the node device is configured to transmit an optical signal without carrying data; wherein
   the bypass path connects to the primary path at locations upstream and downstream of the at least one of the plurality of optical nodes of the primary path for which the bypass path is preselected.

9. The optical network path of claim 8, wherein the bypass path includes at least two optical nodes connected in series, and wherein at least two of the at least two optical nodes have a regenerator associated therewith.

10. The optical network path of claim 8, wherein the primary path includes node devices upstream and downstream of the locations thereof of interconnection with the primary path, and
   at least one of the node devices upstream of the locations of interconnection with the bypass path, and at least one of the node devices downstream of the locations of interconnection with the bypass path include a regenerator associated therewith.

11. The optical network path of claim 8, wherein the optical network path, when rerouted through the bypass path, includes at least two regenerators associated therewith.

12. The optical network path of claim 8, wherein the node device is not dedicated to carry the bypassed optical signal.

* * * * *